(12) United States Patent
Dryer et al.

(10) Patent No.: US 10,818,146 B1
(45) Date of Patent: Oct. 27, 2020

(54) REMOTE MAINTENANCE INITIATION AND COMMUNICATION FOR AN AUTOMATED MACHINE

(71) Applicant: Bank of America Corporation, Charlotte, NC (US)

(72) Inventors: Eric Dryer, Charlotte, NC (US); Jeffrey R. Goertz, Liberty, MO (US); Douglas Scott Wilson, Nashua, NH (US); Carl Parziale, Charlotte, NC (US); Michael Matthew Wisser, Fort Mill, SC (US); Edwin Andrew Wegleitner, Aiken, SC (US); Colleen Marie Powers, Shiloh, IL (US); Gary L. Best, Jr., Acworth, GA (US); Jennifer Ann Raley, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1 day.

(21) Appl. No.: 16/408,225

(22) Filed: May 9, 2019

(51) Int. Cl.
  *G06K 7/00*  (2006.01)
  *G07F 19/00* (2006.01)
  *G06Q 10/00* (2012.01)

(52) U.S. Cl.
  CPC ........... *G07F 19/209* (2013.01); *G06Q 10/20* (2013.01); *G07F 19/202* (2013.01); *G07F 19/206* (2013.01)

(58) Field of Classification Search
  CPC .... G07F 19/209; G07F 19/202; G07F 19/206; G06Q 10/20

USPC ................. 235/435, 439, 454, 462
See application file for complete search history.

(56) References Cited

U.S. PATENT DOCUMENTS

| | | | |
|---|---|---|---|
| 5,105,364 A | 4/1992 | Kawamura et al. | |
| 6,061,121 A | 5/2000 | Holl et al. | |
| 6,164,638 A | 12/2000 | Owens et al. | |
| 6,191,690 B1 | 2/2001 | Mukogawa | |
| 6,290,070 B1 | 9/2001 | Graef et al. | |
| 6,378,770 B1 | 4/2002 | Clark et al. | |
| 6,484,938 B1 | 11/2002 | Shepherd et al. | |
| 6,502,746 B1 | 1/2003 | Do et al. | |
| 6,540,136 B1 | 4/2003 | Ross | |
| 6,913,192 B2 | 7/2005 | Washington et al. | |
| 7,066,335 B2 | 6/2006 | Aas et al. | |

(Continued)

*Primary Examiner* — Matthew Mikels
(74) *Attorney, Agent, or Firm* — Michael A. Springs; Moore & Van Allen PLLC; Peter B. Stewart

(57) ABSTRACT

A system for performing secure maintenance on automated machines may include a maintenance management apparatus and an automated machine. The maintenance management apparatus is configured for scheduling the maintenance appointment for the automated machine, in response to scheduling the maintenance appointment and creating and communicating a maintenance security code to the automated machine. The automated machine is configured for receiving a request from a maintenance provider to initiate the maintenance appointment, validating the maintenance provider using the maintenance security code and providing access to a secure item storage unit, determining that the maintenance provider has completed the maintenance appointment, and communicating information associated with the maintenance appointment to the maintenance management apparatus and/or a computing device of the maintenance provider.

15 Claims, 8 Drawing Sheets

(56) References Cited

U.S. PATENT DOCUMENTS

| | | | |
|---|---|---|---|
| 7,219,083 B2 | 5/2007 | Bellucci et al. | |
| 7,559,459 B2 | 7/2009 | Schmidt et al. | |
| 8,556,164 B1 * | 10/2013 | Freedman | G06Q 30/0207 |
| | | | 235/375 |
| 9,368,003 B2 | 6/2016 | Crews et al. | |
| 9,443,399 B2 | 9/2016 | Turocy et al. | |
| 2004/0038646 A1 * | 2/2004 | Bourgart | H04M 3/10 |
| | | | 455/67.11 |
| 2004/0195302 A1 | 10/2004 | Washington et al. | |
| 2014/0037421 A1 | 2/2014 | Angus | |
| 2015/0066564 A1 | 3/2015 | Neilan | |
| 2015/0178670 A1 | 6/2015 | Angus et al. | |
| 2015/0379489 A1 | 12/2015 | Gopalakrishnan et al. | |

* cited by examiner

REMOTE MAINTENANCE INITIATION AND COMMUNICATION FOR AN AUTOMATED MACHINE

BACKGROUND

There exists a need for an improved system that facilitates a secure way of performing maintenance on automated machines.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for performing secure maintenance on automated machines. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the system of the present invention comprises an automated machine and a maintenance management apparatus. In some embodiments, the maintenance management apparatus is configured for scheduling the maintenance appointment for the automated machine, in response to scheduling the maintenance appointment, creating the maintenance security code, and communicating the maintenance appointment information to the automated machine.

In some embodiments, the automated machine is configured for receiving maintenance appointment information associated with a maintenance appointment from a maintenance management apparatus, the maintenance appointment information comprising a maintenance security code created by the maintenance management apparatus, in response to receiving the maintenance appointment information, performing maintenance pre-processing, receiving a request from a maintenance provider to initiate the maintenance appointment, receiving the maintenance security code from the maintenance provider, validating the maintenance provider in response to receiving the maintenance security code, and in response to validating the maintenance provider, providing the maintenance provider with access to the secure item storage unit.

In some embodiments, the automated machine is configured for receiving maintenance appointment information associated with a maintenance appointment from a maintenance management apparatus, the maintenance appointment information comprising a maintenance security code created by the maintenance management apparatus, receiving a request from a maintenance provider to initiate the maintenance appointment, receiving the maintenance security code from the maintenance provider, validating the maintenance provider in response to receiving the maintenance security code, in response to validating the maintenance provider, providing the maintenance provider with access to the secure item storage unit, determining that the maintenance provider has completed the maintenance appointment, in response to determining that the maintenance provider has completed the maintenance appointment, communicating maintenance completion information to the maintenance provider by (i) displaying a scannable code on a display device of the automated machine, the scannable code comprising the maintenance completion information, or (ii) transmitting the maintenance completion information to a computing device of the maintenance provider.

In some embodiments, the maintenance management apparatus is configured for scheduling the maintenance appointment based on identifying that the automated machine is running low on items stored in the secure item storage unit. In some embodiments, the maintenance management apparatus is configured for scheduling the maintenance appointment based on identifying that software of the automated machine requires updates. In some embodiments, the maintenance management apparatus is configured for scheduling the maintenance appointment based on identifying an issue associated with hardware of the automated machine.

In some embodiments, the maintenance appointment information comprises a scheduled time of the maintenance appointment and validating the maintenance provider is based on part on comparing a current time with the scheduled time of the maintenance appointment.

In some embodiments, the automated machine is configured for displaying at least a portion of the maintenance appointment information to the maintenance provider.

In some embodiments, the automated machine is configured for receiving a request from a maintenance provider to initiate a maintenance appointment, receiving a maintenance security code from the maintenance provider, validating the maintenance provider in response to receiving the maintenance security code, in response to validating the maintenance provider, providing the maintenance provider with access to the secure item storage unit, determining that the maintenance provider has completed the maintenance appointment, in response to determining that the maintenance provider has completed the maintenance appointment, performing reconciliation of items currently in the secure item storage unit, and communicating information associated with the reconciliation of the items to a computing device of the maintenance provider and a maintenance management apparatus.

In some embodiments, the automated machine is configured for receiving a request from a maintenance provider to initiate a maintenance appointment, receiving a maintenance security code from the maintenance provider, validating the maintenance provider in response to receiving the maintenance security code, in response to validating the maintenance provider, providing the maintenance provider with access to the one or more secure item storage units, determining that at least one item is misplaced in at least one of the one or more secure item storage units, and displaying misplacement information associated with misplacement of the at least one item to the maintenance provider.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
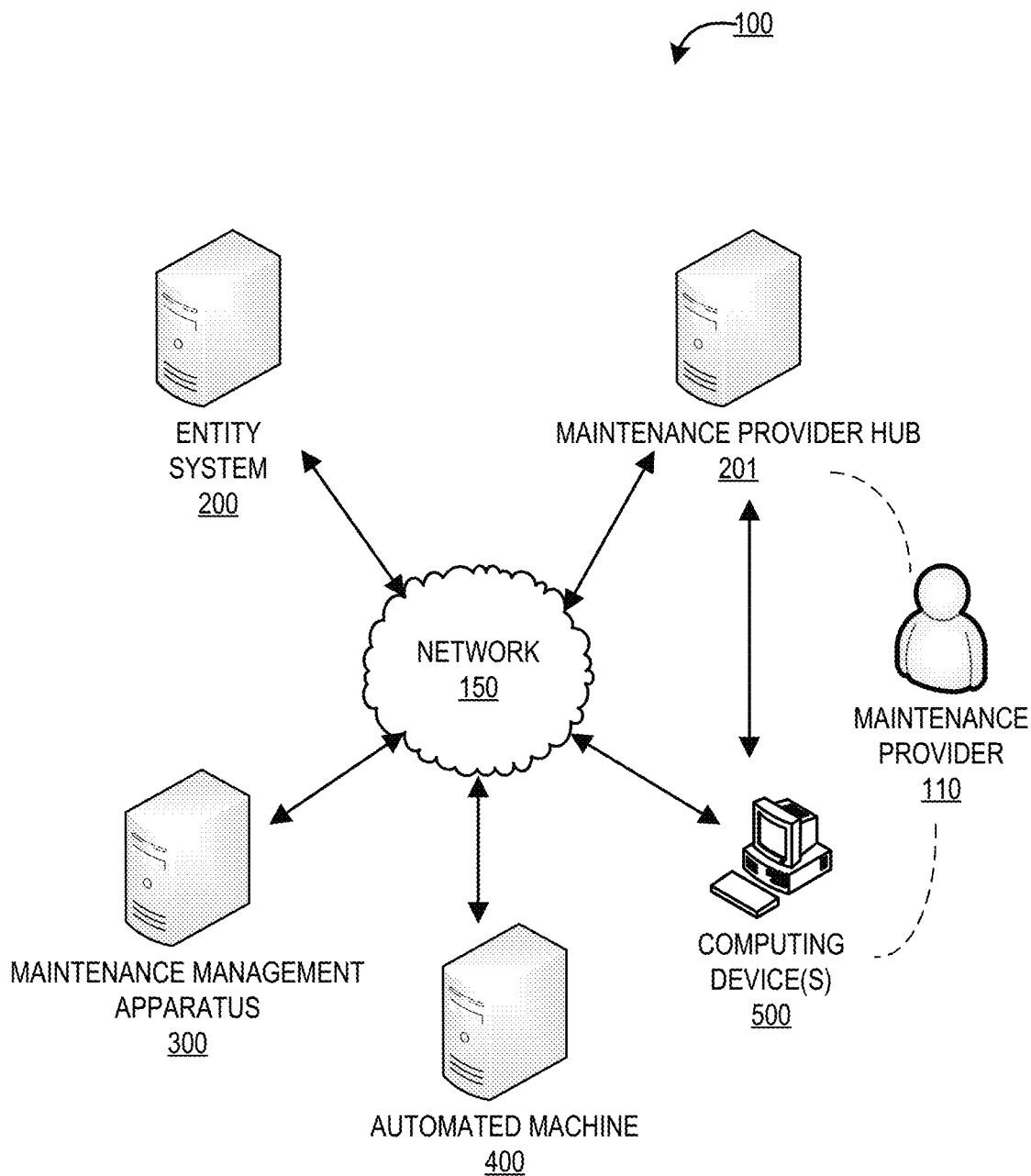
Figure 2:
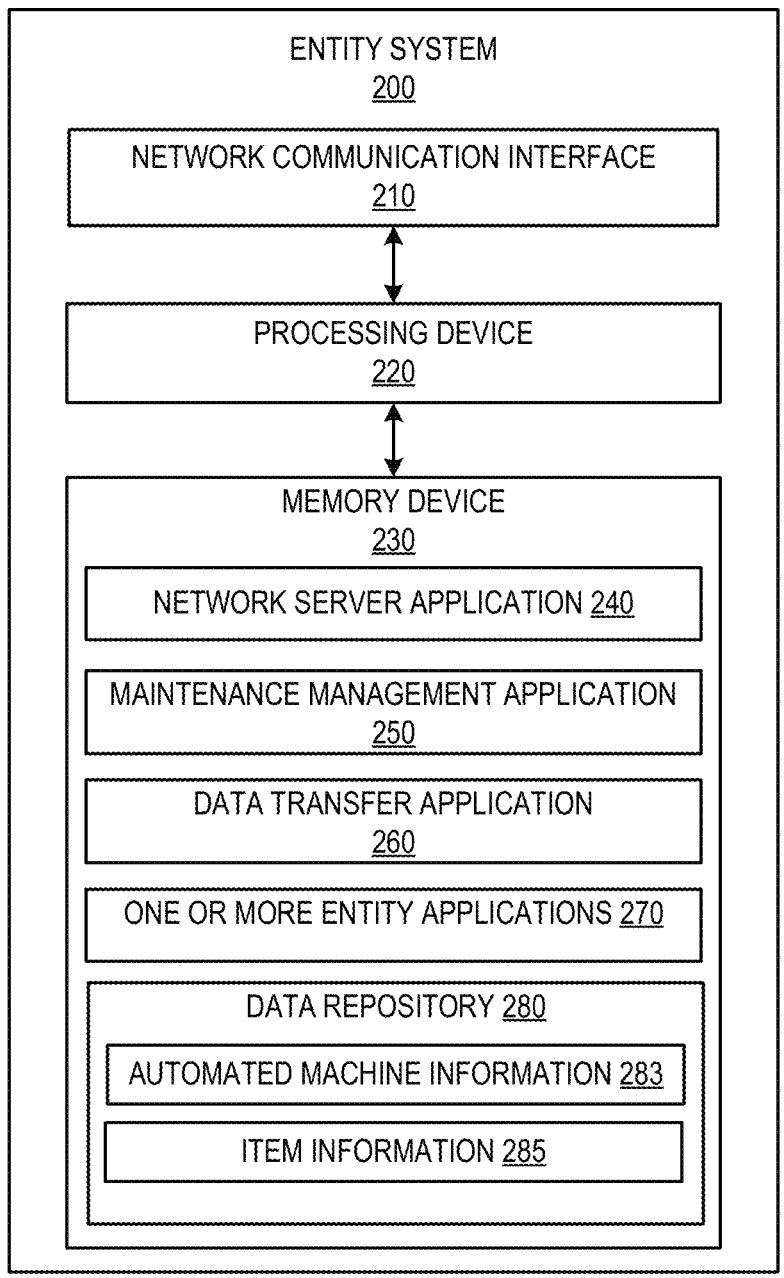
Figure 3:
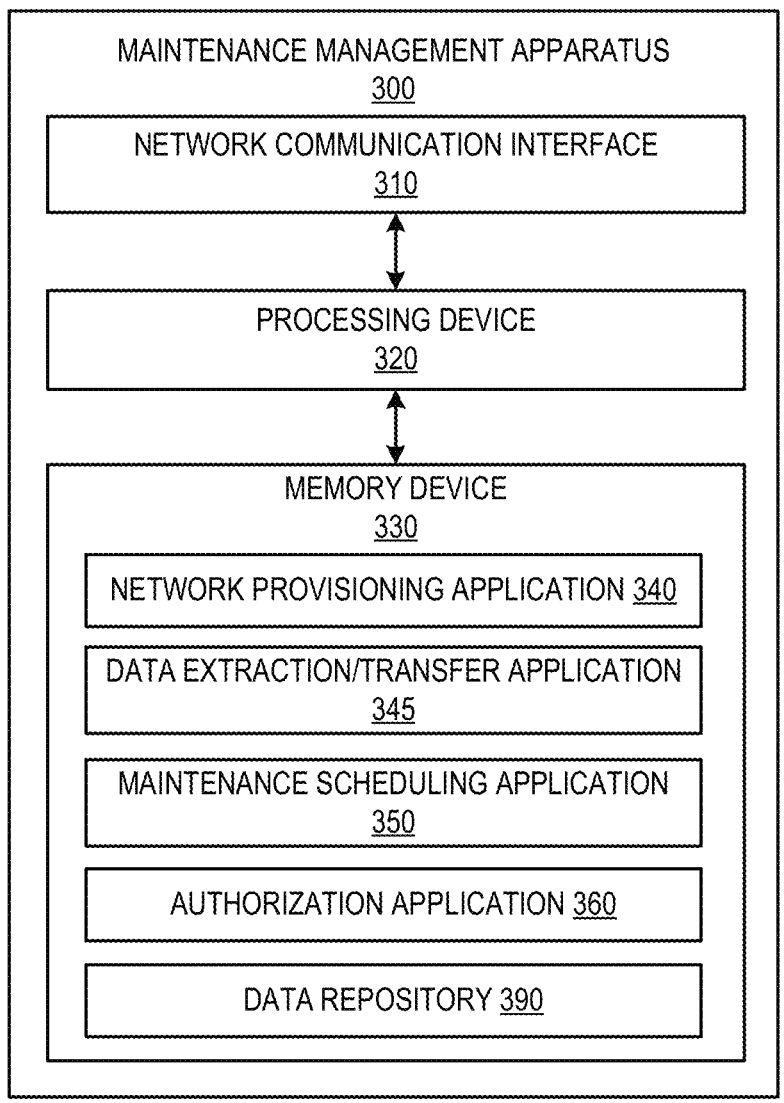
Figure 4:
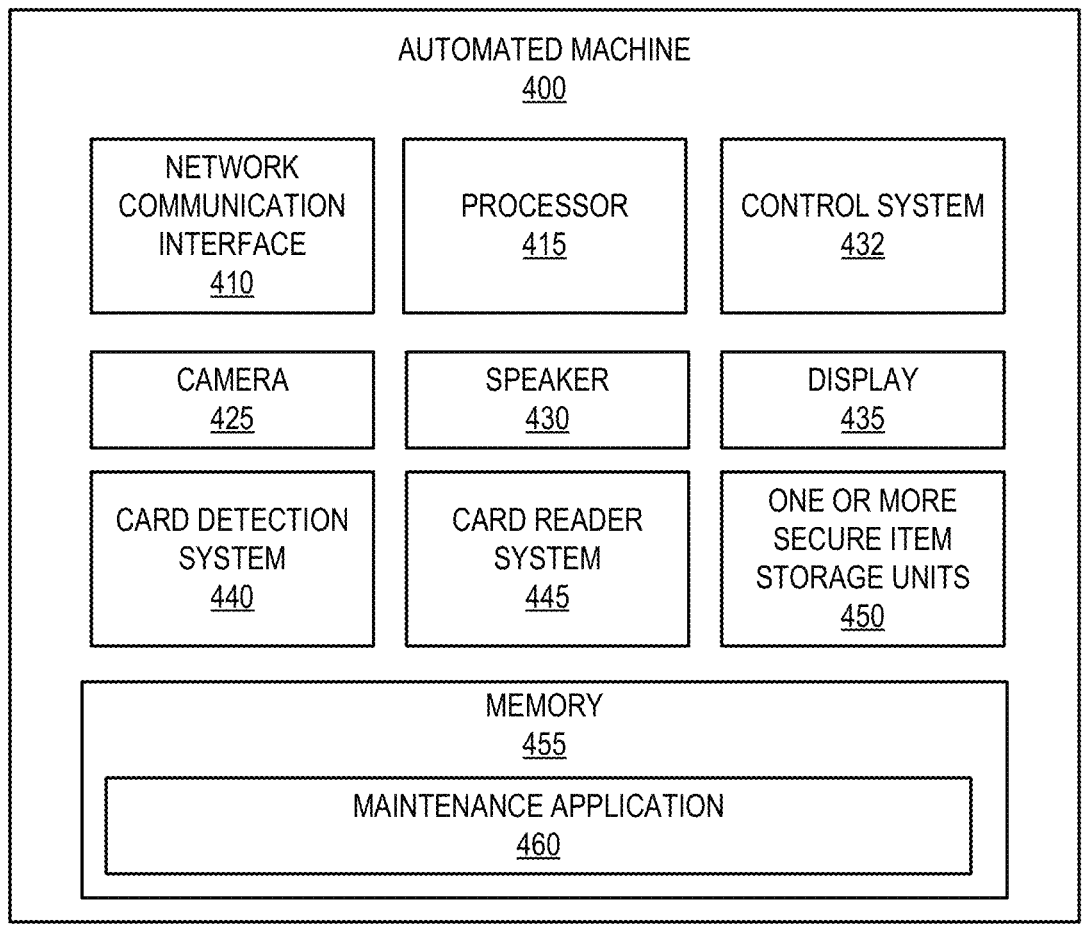
Figure 5:
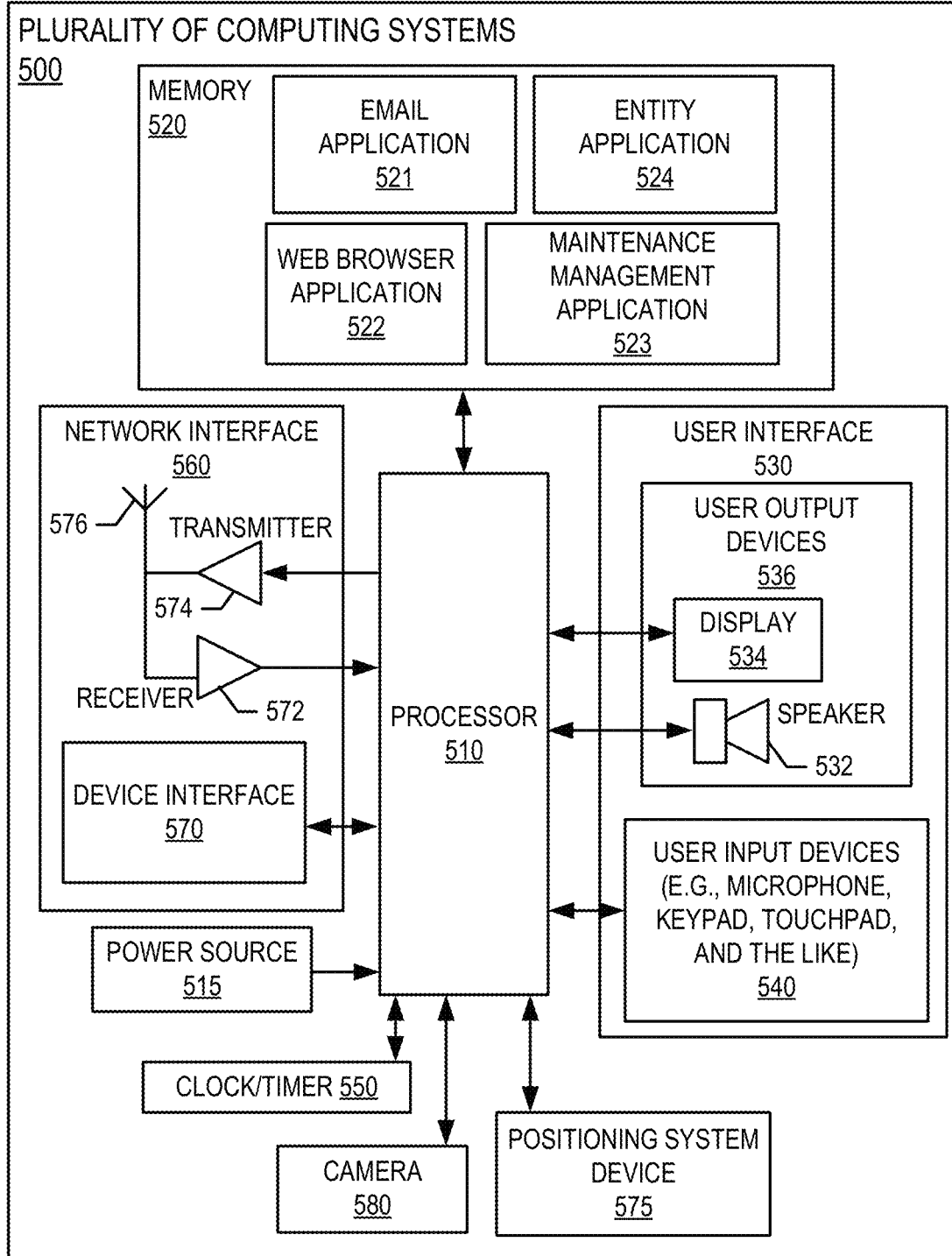
Figure 6A:
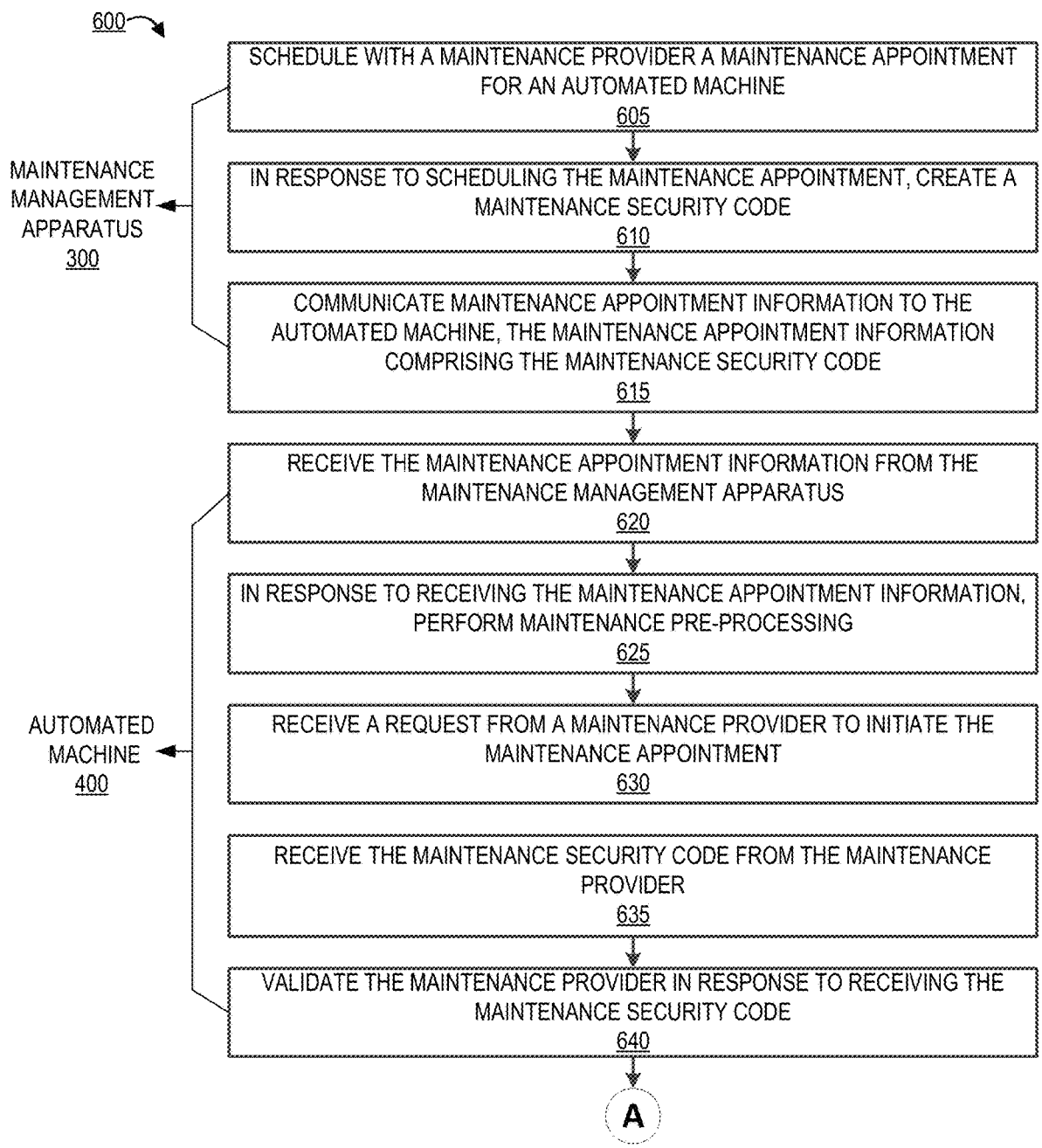
Figure 6B:
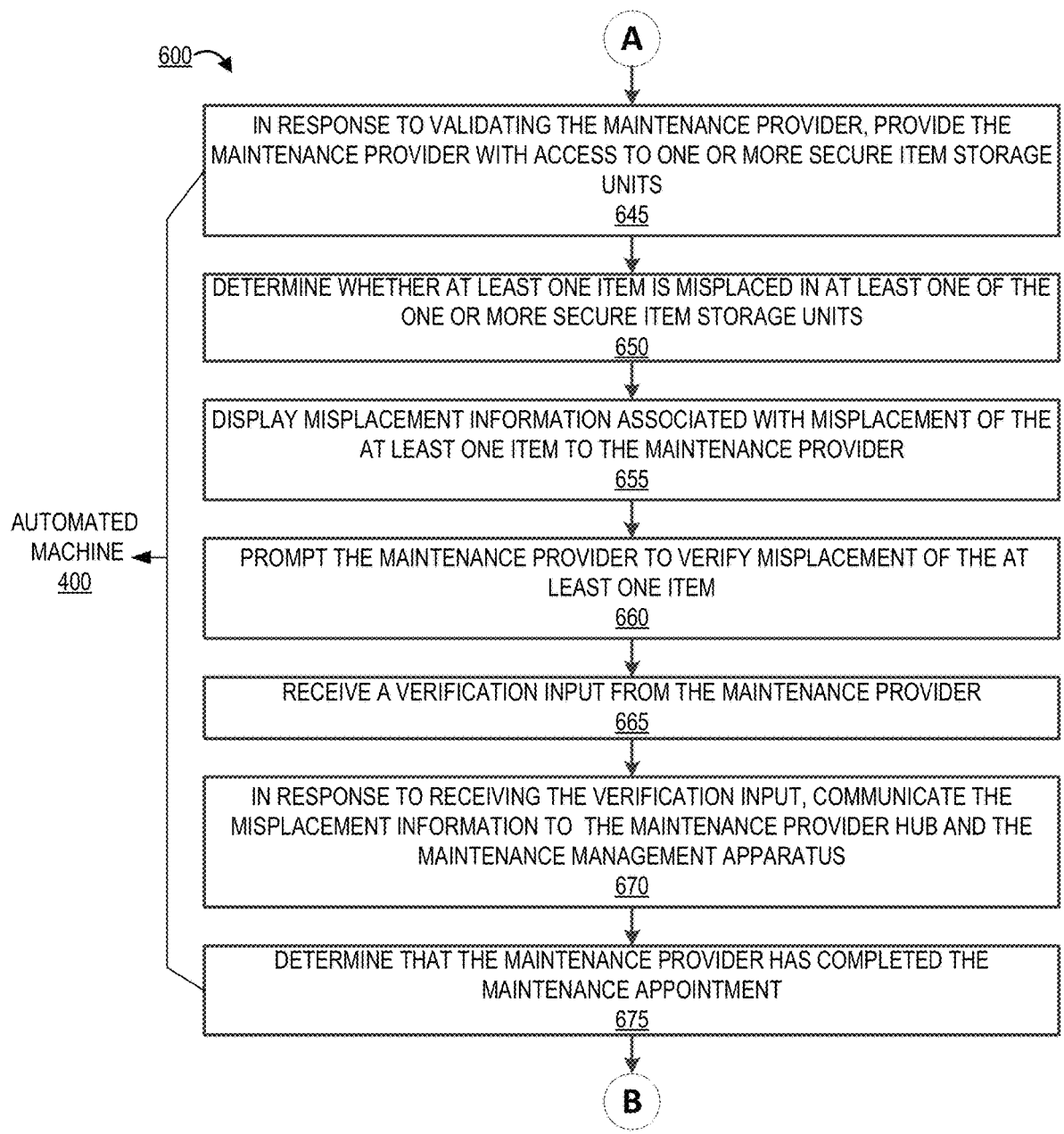
Figure 6C:
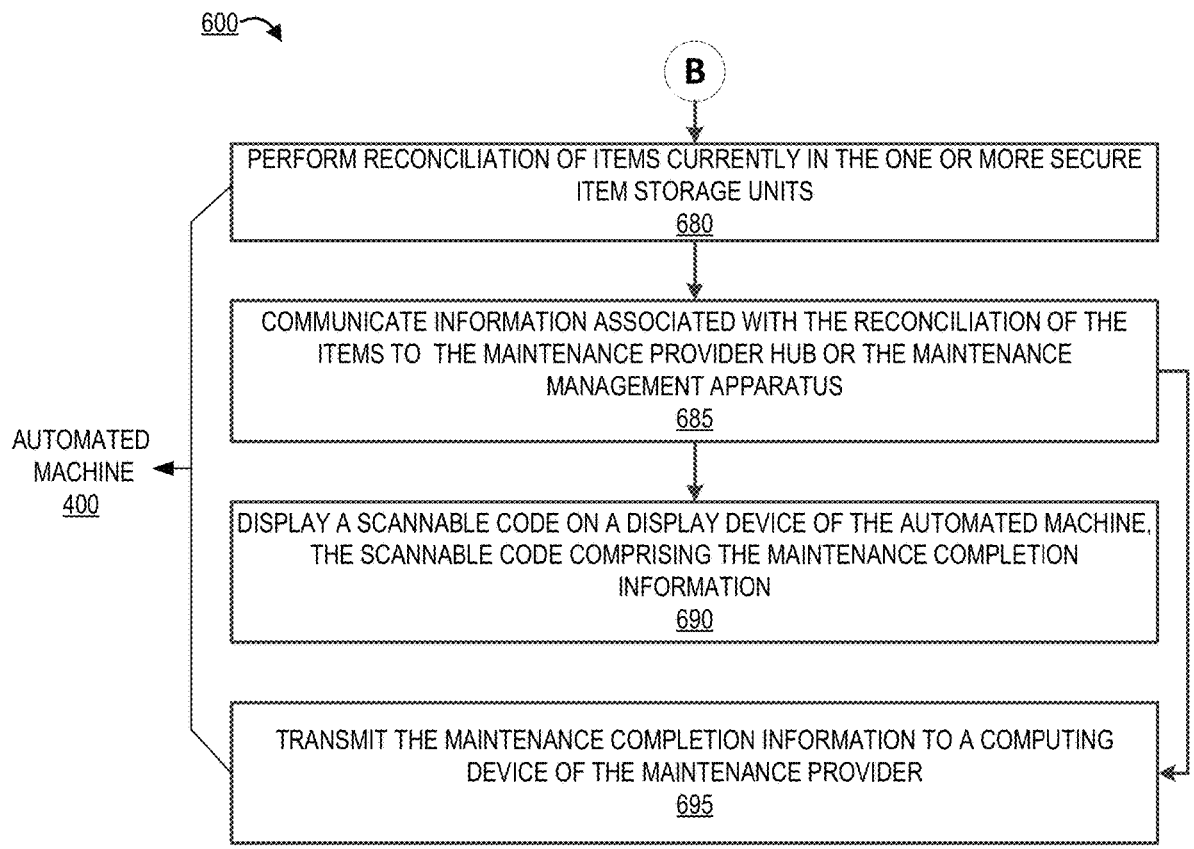

Having thus described embodiments of the invention in general terms, reference will now be made the accompanying drawings, wherein:

FIG. 1 provides a block diagram illustrating a system environment for performing secure maintenance on automated machines, in accordance with an embodiment of the invention;

FIG. 2 provides a block diagram illustrating the entity system 200 of FIG. 1, in accordance with an embodiment of the invention;

FIG. 3 provides a block diagram illustrating a maintenance management apparatus 300 of FIG. 1, in accordance with an embodiment of the invention;

FIG. 4 provides a block diagram illustrating an automated machine 400 of FIG. 1, in accordance with an embodiment of the present invention;

FIG. 5 provides a block diagram for a computing device 500 of FIG. 1, in accordance with an embodiment of the present invention;

FIG. 6A provides a flowchart illustrating a process flow for performing secure maintenance on automated machines, in accordance with an embodiment of the invention;

FIG. 6B provides a flowchart illustrating a continuation of the process flow for performing secure maintenance on automated machines, in accordance with an embodiment of the invention; and FIG. 6C provides a flowchart illustrating a continuation of the process flow for performing secure maintenance on automated machines, in accordance with an embodiment of the invention

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" may be any institution which involves in financial transactions. In one embodiment, the term "entity" or "resource entity" may be any financial institution. As used herein, the term "automated machine" may be any automated devices that are involved in distribution of resources such as cash, checks, electronic transfers, money orders or the like which may be performed using a credit card, a debit card, or the like. In some embodiments of the present invention, the automated machine may be an Automated Teller Machine (ATM). In some embodiments, the automated machine may be owned and/or controlled by the resource entity. As used herein, the term "maintenance provider" may be an employee, contractor, sub-contractor, or the like of any third party entity that provides maintenance services associated with the automated machines. As used herein, the term "items" or "resources" may include any type of monetary bills, checks, or the like.

Typically, maintenance of automated machines involves a maintenance provider going to the automated machine and manually performing a series of actions depending on the type of maintenance. These series of actions increase the down time of automated machines, thereby decreasing the efficiency of the process of performing maintenance on automated machines. For example, to settle an automated machine, a maintenance provider has to take a paper receipt that has information associated with the settlement process and manually key in the information into the automated machine to complete the process of settlement. Additionally, after the completion of the settlement process, the maintenance provider has to take a receipt from the automated machine and manually key in the information into a system associated with the resource entity. In another example, where the maintenance being performed on the automated machine is cash pick-up and/or check pick-up, the maintenance provider picks up the cash bin and/or the check bin from the automated machine and drops it off at a vault that is maintained by a third party or the resource entity. During this process, the cash bin may comprise misplaced checks or vice versa and the current systems do not alert the maintenance provider, thereby increasing the settlement time associated with the processing of the misplaced check or misplaced cash and decreasing the efficiency of the settlement process. As such, there exists a need for an improved system to efficiently perform the maintenance on automated machines.

The system of the present invention solves the above discussed problems by performing pre-processing at a time before the scheduled maintenance appointment that reduces the overall time of the maintenance process, improving the security of the process by authenticating the maintenance provider based on a code that was generated during scheduling of the maintenance appointment, gathering information associated with the misplaced items and notifying the maintenance provider of such anomalies, performing self-reconciliation of items, and automatically transferring information associated with the maintenance in response to identifying that the maintenance is complete.

FIG. 1 provides a block diagram illustrating a system environment 100 for performing secure maintenance on automated machines, in accordance with an embodiment of the invention. As illustrated in FIG. 1, the environment 100 includes a maintenance management apparatus 300, one or more automated machines 400, entity system 200, maintenance provider hub 201, and one or more computing devices 500. Maintenance provider hub 201 may be a group of systems associated with a third party entity that provides maintenance services associated with the automated machines 400. One or more maintenance providers 110 interact with the other entities of the system environment 100 via a user interface of the computing device 500. The one or more maintenance providers 110 may be employees of the third party entity, where the one or more maintenance providers perform maintenance of the one or more automated machines 400. In some embodiments, the resource entity may be the provider of maintenance services associated with the automated machines 400. In such an embodiment, the maintenance provider may be an employee of the resource entity.

In some embodiments, the maintenance management apparatus 300 may be a part of the entity system 200. In some embodiments, the maintenance management apparatus 300 may be a remote and independent system which interacts with other systems in the system environment to perform one or more steps described herein. In some embodiments, the maintenance management apparatus 300 and the one or more automated machines 400 may be owned by a resource entity associated with the entity system 200. In some embodiments, the automated machine 400 may be operated and/or controlled by the maintenance management apparatus 300. In some embodiments, the one or more automated machines 400 may be operated and/or controlled by the entity systems 200. In some embodiments, the one or more automated machines 400 may be operated and/or controlled by both the maintenance management apparatus 300 and the entity system 200.

The entity system(s) 200 may be any system owned or otherwise controlled by the resource entity. The entity may be any entity which is involved in financial transactions. In some embodiments, the entity is a financial institution. The maintenance management apparatus 300 and/or the automated machine 400 may communicate with entity system 200 to perform one or more steps described herein. For example, the entity system 200 may provide information associated with the settlement of automated machines, wherein the information may include customer data, transactional data, or the like.

The maintenance management apparatus 300, the entity system 200, the maintenance provider hub 201, the computing device 500, and/or the one or more automated machines 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a maintenance management application 250, a data transfer application 260, one or more entity applications 270, and a data repository 280 comprising automated machine information 283 and item information 285. The automated machine information 283 may be any information associated with the one or more automated machines 400. In some embodiments, the item information 285 may be information associated with the status of items in the one or more automated machines 400. The computer-executable program code of the network server application 240, the maintenance management application 250, the data transfer application 260, and the one or more entity applications 270 may instruct the processing device 220 to perform certain logic, data-extraction, and data-storing functions of the entity system 200 described herein, as well as communication functions of the entity system 200.

The network server application 240, the maintenance management application 250, the data transfer application 260, and the one or more entity applications 270 are configured to store data in the data repository 280 or to use the data stored in the data repository 280 when communicating through the network communication interface 210 with the maintenance management apparatus 300 and the one or more automated machines 400 to perform one or more process steps described herein. In some embodiments, the entity system 200 may receive instructions from the maintenance management apparatus 300 via the maintenance management application 250 to perform certain data transfer operations. Upon receiving the instructions from the maintenance management apparatus 300, the entity system 200 transfers data via the data transfer application 260.

FIG. 3 provides a block diagram illustrating the maintenance management apparatus 300 in greater detail, in accordance with embodiments of the invention. As mentioned above, the maintenance management apparatus 300 of FIG. 1 is configured to perform the one or more functions described herein. In particular, the maintenance management apparatus 300 is a backend system that communicates with the maintenance provider hub 201 and the maintenance providers to schedule and track the maintenance appointments associated with the automated machines 400.

As illustrated in FIG. 3, in one embodiment of the invention, the maintenance management apparatus 300 includes one or more processing devices 320 operatively coupled to a network communication interface 310 and a memory device 330. In some embodiments, the maintenance management apparatus 300 is operated by the resource entity, such as a financial institution. In some embodiments, the maintenance management apparatus 300 may be an independent system. In alternate embodiments, the maintenance management apparatus 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the maintenance management apparatus 300 described herein. For example, in one embodiment of the maintenance management apparatus 300, the memory device 330 includes, but is not limited to, a network provisioning application 340, a data extraction/transfer application 345, a maintenance scheduling application 350, an authorization application 360, and a data repository 390. The computer-executable program code of the network provisioning application 340, the data extraction/transfer application 345, the maintenance scheduling application 350, and the authorization application 360 may instruct the processing device 320 to perform certain logic, data-processing, and data-storing functions of the maintenance management apparatus 300 described herein, as well as communication functions of the maintenance management apparatus 300.

In some embodiments, the network provisioning application 340, the data extraction/transfer application 345, the maintenance scheduling application 350, and the authorization application 360 may be a part of single application. The network provisioning application 340 may allow the maintenance management apparatus 300 to communicate with the one or more automated machines 400, entity system 200, and maintenance provider hub 201 to perform one or more operation disclosed in the process flow 600 of FIG. 6. The data extraction/transfer application 345 may extract data from data repository 280 of entity system or the data repository 390 and may use the data to schedule maintenance appointments. The maintenance scheduling application 350 schedules the maintenance appointments associated with the one or more automated machines 400. The authorization application 360 generates one or more codes that authenticate the one or more maintenance providers 110 to gain access to the, the one or more automated machines 400. The data extraction/transfer application 345 may further transmit the data associated with the scheduled maintenance appointments to the one or more automated machines 400.

FIG. 4 provides a block diagram of the automated machine 400, in accordance with an embodiment of the present invention. As illustrated in FIG. 4, in one embodiment of the invention, the automated machine 400 includes a processor 415 operatively coupled to a network communication interface 410, a memory component 455, a control system 432, a camera 425, a speaker 430, a display 435, a card detection system 440, a card reader system 445, and one or more secure item storage units 450. The card detection system 440 and the card reader system 445 may be mechanisms that aid the transactions performed at the automated machine. The automated machine 400 may include other components such as bar code scanner, item counter, and/or item tracker to perform multiple functions of the automated machine 400 as described in the process flow 600 of FIG. 6 below. The one or more secure item storage units 450 may be any secure container (e.g., cassettes) that hold items such as cash bills, checks, or the like. Each of the one or more secure item storage units may be configured to receive and/or dispense certain items. For example, a first secure item storage unit may be configured to receive cash bills, a second secure item storage unit may be configured to received checks, and a third secure item storage unit may be configured to dispense cash bills.

It should be understood that the memory 455 may include one or more databases or other data structures/repositories. The memory 455 includes a maintenance application 460 that comprises computer-executable program code that instructs the processor 415 to operate the network communication interface 410 to perform certain communication functions of the automated machine 400 described herein and also instructs the processor 415 to cause the control system 432 to perform certain actions of the automated machine 400 including, but not limited to, dispensing items, displaying messages on the display 435, tracking items, performing item count, or the like as explained in greater detail in FIG. 6. TIn some embodiments, based on the instructions and control signals received from the maintenance management apparatus 300 or the executable instructions present in the maintenance application 460, the processor 415 via the control system 432 may operate the automated machine 400 such as displaying messages on the display 435, completing settlement process, or perform its certain other actions described herein.

FIG. 5 provides a block diagram illustrating the computing systems 500 of FIG. 1 in more detail, in accordance with embodiments of the invention. The computing systems 500 may be associated with one of the plurality of maintenance providers 110. In one embodiment the plurality of maintenance providers 110 may be an employee, contractor, or the like of entity that provides maintenance services to the one or more automated machines 400. In some embodiments, the plurality of maintenance providers 110 may be an employee of the resource entity. The computing device 500 may be a mobile telephone or any other mobile device. However, it should be understood that a mobile telephone is merely illustrative of one type of the computing device 500 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device 500 include a processor 510 communicably coupled to such devices as a memory 520, user output devices 536, user input devices 540, a network interface 560, a power source 515, a clock or other timer 550, a camera 580, and a positioning system device 575. The processor 510, and other processors described herein, generally include circuitry for implementing communication and/or logic functions of the computing device 500. For example, the processor 510 may include a digital signal processor device, a microprocessor device, and various analog to digital converters, digital to analog converters, and/or other support circuits. Control and signal processing functions of the computing device 500 are allocated between these devices according to their respective capabilities. The processor 510 thus may also include the functionality to encode and interleave messages and data prior to modulation and transmission. The processor 510 can additionally include an internal data modem. Further, the processor 510 may include functionality to operate one or more software programs, which may be stored in the memory 520. For example, the processor 510 may be capable of operating a connectivity program, such as a web browser application 522. The web browser application 522 may then allow the computing device 500 to transmit and receive web content, such as, for example, location-based content and/or other web page content, according to a Wireless Application Protocol (WAP), Hypertext Transfer Protocol (HTTP), and/or the like.

The processor 510 is configured to use the network interface 560 to communicate with one or more other devices on the network 150. In this regard, the network interface 560 includes an antenna 576 operatively coupled to a transmitter 574 and a receiver 572 (together a "transceiver"). The processor 510 is configured to provide signals to and receive signals from the transmitter 574 and receiver 572, respectively. The signals may include signaling information in accordance with the air interface standard of the applicable cellular system of the network 150. In this regard, the computing device 500 may be configured to operate with one or more air interface standards, communication protocols, modulation types, and access types. By way of illustration, the computing device 500 may be configured to operate in accordance with any of a number of first, second, third, and/or fourth-generation communication protocols and/or the like. For example, the computing device 500 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device 500 may also be configured to operate in accordance with non-cellular communication mechanisms, such as via a wireless local area network (WLAN) or other communication/data networks.

As described above, the computing device 500 has a user interface that is, like other user interfaces described herein, made up of user output devices 536 and/or user input devices 540. The user output devices 536 include a display 530 (e.g., a liquid crystal display or the like) and a speaker 532 or other audio device, which are operatively coupled to the processor 510.

The user input devices 540, which allow the computing device 500 to receive data from a plurality of maintenance providers 110, may include any of a number of devices allowing the computing device 500 to receive data from the plurality of maintenance providers 110, such as a keypad, keyboard, touch-screen, touchpad, microphone, mouse, joystick, other pointer device, button, soft key, and/or other input device(s). The user interface may also include a camera 580, such as a digital camera.

The computing device 500 may also include a positioning system device 575 that is configured to be used by a positioning system to determine a location of the computing device 500. For example, the positioning system device 575 may include a GPS transceiver. In some embodiments, the positioning system device 575 is at least partially made up of the antenna 576, transmitter 574, and receiver 572 described above. For example, in one embodiment, triangulation of cellular signals may be used to identify the approximate or exact geographical location of the computing device 500. In other embodiments, the positioning system device 575 includes a proximity sensor or transmitter, such as an RFID tag, that can sense or be sensed by devices known to be located proximate a merchant or other location to determine that the computing device 500 is located proximate these known devices.

The computing device 500 further includes a power source 515, such as a battery, for powering various circuits and other devices that are used to operate the computing device 500. Embodiments of the computing device 500 may also include a clock or other timer 550 configured to determine and, in some cases, communicate actual or relative time to the processor 510 or one or more other devices.

The computing device 500 also includes a memory 520 operatively coupled to the processor 510. As used herein, memory includes any computer readable medium (as defined herein below) configured to store data, code, or other information. The memory 520 may include volatile memory, such as volatile Random Access Memory (RAM) including a cache area for the temporary storage of data. The memory 520 may also include non-volatile memory, which can be embedded and/or may be removable. The non-volatile memory can additionally or alternatively include an electrically erasable programmable read-only memory (EEPROM), flash memory or the like.

The memory 520 can store any of a number of applications which comprise computer-executable instructions/code executed by the processor 510 to implement the functions of the computing device 500 and/or one or more of the process/method steps described herein. For example, the memory 520 may include such applications as a conventional web browser application 522, an email application 521, an entity application 524, a maintenance management application 523, maintenance provider application (not shown) or the like. The email application 521, the web browser application 522, the maintenance management application 523 may allow the plurality of maintenance providers 110 to communicate with the maintenance management apparatus 300, the one or more automated machines 400, the maintenance provider hub 201, and/or the entity systems 200. The entity application 524 allows the one or more maintenance providers 110 to interact with the plurality of entity systems 200. The maintenance management application 523 may be present in the memory 520 of the computing device 500 to allow direct communication with the maintenance management apparatus 300 and also the one or more automated machines 400. The maintenance provider hub application may allow the maintenance providers 110 to communicate with the maintenance provider hub 201.

The memory 520 can also store any of a number of pieces of information, and data, used by the computing device 500 and the applications and devices that make up the computing device 500 or are in communication with the computing device 500 to implement the functions of the computing device 500 and/or the other systems described herein.

FIG. 6A, FIG. 6B, and FIG. 6C provide a flowchart illustrating a process flow 600 for performing secure maintenance on automated machines, in accordance with an embodiment of the present invention. The steps described in the process flow 600 are typically performed by the maintenance management apparatus 300 and the automated machine 400. Steps disclosed in blocks 605-615 are typically performed by the maintenance management apparatus 300 and the steps disclosed in blocks 620-695 are typically performed by the automated machine 400.

As shown in block 605, the maintenance management apparatus 300 initially schedules with a maintenance provider a maintenance appointment for an automated machine. The maintenance management apparatus 300 may communicate with the maintenance provider hub 201 to schedule the maintenance appointment with the maintenance provider. The maintenance appointment may be an appointment for any kind of service including, but not limited to, settlement of automated machines, replenishing items, item pick-up, software installations, software updates, hardware installations, hardware repair, network related updates, or the like. In some embodiments, the maintenance management apparatus 300 may schedule the maintenance appointment for an automated machine based on information communicated by the automated machine. For example, the automated machine may communicate the amount of items currently available and the maintenance management apparatus 300 may determine that the automated machine is running low on certain items and may schedule the maintenance appointment for replenishing the items that are low. In some embodiments, the maintenance appointment scheduled by the maintenance management apparatus 300 may be a monthly pre-scheduled maintenance. For example, each of the automated machines may need service every month to keep the software and hardware associated with the automated machines up to date.

As shown in block 610, the maintenance management apparatus 300 in response to scheduling the maintenance appointment, creates a maintenance security code. The maintenance security code may be any type of code such as a computer scannable code, n-digit pin, a pattern, or the like. In some embodiments, the maintenance security code may be a single use code.

As shown in block 615, the maintenance management apparatus 300 communicates maintenance appointment information to the automated machine, the maintenance appointment information typically includes the maintenance security code. In some embodiments, the maintenance appointment information may include other information associated with the maintenance appointment such as type of the maintenance appointment, appointment time, based on the type of appointment, the number of incoming items, number of items that are being picked up, or the like. In some embodiments, the maintenance management apparatus may communicate the maintenance appointment information to the computing device 500 of the maintenance provider and/or the maintenance provider hub 201.

As shown in block 620, the automated machine 400 receives the maintenance appointment information from the maintenance management apparatus. As shown in block 625, the automated machine 400 in response to receiving the maintenance appointment information, performs maintenance pre-processing. Pre-processing may include gathering information associated with the current items present in the one or more secure item storage units 450 of the automated machine, running diagnostics during down time, preparing to launch an authentication application for the maintenance appointment, or the like.

As shown in block 630, the automated machine 400 receives a request from a maintenance provider to initiate the maintenance appointment. The maintenance provider may arrive at the automated machine 400 and initiate the maintenance appointment by keying in the maintenance security code using the keypad or the display 435 of the automated machine 400 or by scanning the maintenance security code using a scanner of the automated machine 400, or by communicating with an NFC interface of the automated machine 400. This eliminates the step of manually keying in information associated with maintenance request and thereby, increasing the efficiency of the process of performing maintenance on automated machines. For example, as explained above, in the existing conventional systems, the maintenance provider has to carry a piece of paper containing information (e.g., number of incoming cassettes, amount of incoming cash, manual codes, a series of steps to be performed to initiate the maintenance, or the like) associated with the maintenance request and has to manually enter information present on the paper into the automated machine to initiate the maintenance appointment. This increases the overall downtime of the automated machine and decreases the efficiency of the process of performing maintenance. The steps described in the blocks 605-630 eliminate the problem of having to manually keying in all the information, thereby enhancing the entire process of performing maintenance on automated machines 400.

As shown in block 635, the automated machine 400 receives the maintenance security code from the maintenance provider. As shown in block 640, the automated machine 400 validates the maintenance provider in response to receiving the maintenance security code. The automated machine 400 typically validates the maintenance provider by verifying whether the maintenance security code received from the maintenance provider and the maintenance security code received from the maintenance management apparatus 300 are a match. In some embodiments, the automated machine 400 may also validate the maintenance provider based on comparing current time and the scheduled time of appointment.

As shown in block 645, the automated machine 400 in response to validating the maintenance provider, provides the maintenance provider with access to the one or more secure item storage units. In some embodiments, providing access to the one or more secure item storage units may include automatically opening the secure item storage units. In some embodiments, providing access to the one or more secure item storage units may include permitting the maintenance provider to open the one or more secure item storage units.

As shown in block 650, the automated machine 400 determines that at least one item is misplaced in at least one of the one or more secure item storage units 450. The automated machine 400 may determine whether the at least one item is misplaced based on tracking the items. In this regard, the automated machine 400 may receive the items from one or more users and upon receiving the items, processes each of the items, sorts the items based on processing each of the items, and initiates the transfer of the items to the one or more secure item storage units 450. In some embodiments, the one or more users may be customers of the resource entity, where the resource entity maintains one or more accounts of the one or more users. In some embodiments, the one or more users may not be customers of the resource entity.

In one example, the automated machine receives $X bills and $Y bills from a user, processes the $X bills and $Y bills, sorts the $X bills and $Y bills, and initiates transfer of the $X bills to a first secure item storage unit that is configured to receive $X bills and the $Y bills to a second secure item storage unit that is specifically configured to receive $Y bills. In another example, the automated machine receives a check from a user and processes the check, and initiates the transfer of the check to a secure item storage unit that is configured to receive only checks. In some embodiments, the automated machine may identify misplacement of the items while processing the items. For example, a user may insert a check into a check deposit slot and a cash bill may be stuck under the check without the user's knowledge. The automated machine 400, while processing the check may identify that the cash bill along with the check is transferred to a secure item storage units that is configured for receiving checks. In another example, a user may insert a cash bill in a check deposit slot of the automated machine 400 and the cash bill may be transferred to a secure item storage unit that is configured to receive only checks. In some embodiments, the automated machine while transferring the items to the one or more secure item storage units 450, tracks the transfer of the items to identify the misplacement of the items. For example, a check may be transferred to a secure item storage unit that is configured for receiving cash due to a mechanical issue even though the automated machine processed the check and initiated the transfer of the check to a secure item storage unit that is configured for receiving checks.

As shown in block 655, the automated machine 400 displays misplacement information associated with misplacement of the at least one item to the maintenance provider. Misplacement information may include type of the item, misplaced item id, and an id associated with the secure item storage unit that the misplaced item is in, or the like. As shown in block 660, the automated machine 400 prompts the maintenance provider to verify misplacement of the at least one item. As shown in block 665, the automated machine 400 receives a verification input from the maintenance provider. The maintenance provider upon receiving the prompt, checks whether the item is in the secure item storage unit associated with the id displayed to the maintenance provider, and confirms by providing the verification input via the display 435 or the keypad of the automated machine 400. As shown in block 670, the automated machine 400 in response to receiving the verification input, communicates the misplacement information to the maintenance provider hub 201 and the maintenance management apparatus 300.

In some embodiments where there are no misplaced items, the automated machine 400 displays item information in each of the one or more secure item storage units 450 and prompts the maintenance provider to verify the contents of the one or more secure item storage units 450. The maintenance provider upon receiving the prompt, checks whether the item information matches the items in the one or more secure item storage units 450 and provides a second verification input via the display 435 or the keypad of the automated machine 400. In response to receiving the second verification input, the automated machine may transmit the item information to the maintenance management apparatus and/or the maintenance provider hub 201. In some embodiments, the maintenance provider may provide the verification inputs via any other parts (e.g., microphone, camera, display, or the like) of the automated machine.

As shown in block 675, the automated machine 400 determines that the maintenance provider has completed the maintenance appointment. In some embodiments, the automated machine may determine that the maintenance provider has completed the maintenance appointment based on the type of the maintenance appointment. For example, if the maintenance appointment is associated with item replenishment, the system may determine that the maintenance provider has completed the maintenance appointment based on determining that the maintenance provider has closed the door of a vault that holds the one or more secure item storage units 450.

As shown in block 680, the automated machine 400 performs reconciliation of items currently in the one or more secure item storage units 450. The automated machine 400 performs reconciliation of items currently in the one or more secure item storage units 450 based on the type of the maintenance appointment. For example, if the maintenance appointment is associated with cash replenishment, the system reconciles the amount of cash in the one or more secure item storage units. As shown in block 685, the automated machine 400 communicates information associated with the reconciliation of the items to the maintenance provider hub and/or the maintenance management apparatus. In some embodiments, based upon the transaction data, the automated machine keeps track of the items in the one or more secure item storage units. For example, the automated machine may calculate the amount of items available before the maintenance appointment based on the transaction information. In some embodiments, based upon the actions performed by the maintenance provider during the maintenance appointment, the automated machine may identify the amount of items available after the maintenance appointment. For example, the automated machine identifies that a first secure item storage unit containing 'n' number of $Y bills is replaced by a second secure item storage unit containing 'm' number of $X bills and a third secure item storage unit containing 'k' number of $Z bills is not replaced. In some embodiments, the system may use the transaction data and the information associated with the actions performed by the maintenance provider to perform reconciliation of items. For example, the automated machine may reconcile the bills that are in the second secure item storage unit and the third secure item storage unit and may communicate the reconciliation information to the maintenance provider hub and/or the maintenance management apparatus. Additionally, the automated machine may also communicate the information associated with the number of bills in the first secure item storage unit that was picked up by the maintenance provider. In some embodiments, based upon the reconciliation information, the maintenance management apparatus and/or the maintenance provider hub may use the reconciliation information to update ledgers and/or to create invoices.

As shown in block 690, the automated machine 400 displays a scannable code on a display device of the automated machine, the scannable code comprising the maintenance completion information. The scannable code may be a QR code, a barcode, or the like. The maintenance provider may scan the scannable code via the computing device to transfer the maintenance completion information to the maintenance provider hub 201. The maintenance completion information may include duration of the maintenance service, actions performed by the maintenance provider (e.g., number of cassettes removed from the automated machine and a number of bills present in each of those cassettes, number of cassettes placed in the automated machine and number of bills present in each of those cassettes, or the like), status of the automated machine, or the like.

As shown in block 695, the automated machine 400 instead of generating and displaying the scannable code, transmits the maintenance completion information to maintenance provider hub 201. In some embodiments, the automated machine in response to determining that the maintenance provider has completed the maintenance appointment, may transmit the maintenance completion information to the maintenance management apparatus 300. The maintenance management apparatus 300 may use the maintenance completion information to automatically initiate invoicing procedure associated with the maintenance appointment.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| U.S. patent application Ser. No. 16/408,184 | PERFORMING SECURE MAINTENANCE PROCESSING ON AN AUTOMATED MACHINE | Concurrently herewith |
| U.S. patent application Ser. No. 16/408,190 | AUTOMATED MACHINE WITH SELF-RECONCILIATION OF RESOURCES | Concurrently herewith |
| U.S. patent application Ser. No. 16/408,197 | TRACKING AND PROCESSING OF RESOURCES ASSOCIATED WITH AN AUTOMATED MACHINE FOR RECONCILIATION | Concurrently herewith |

The invention claimed is:

1. A system for providing remote maintenance initiation communication for an automated machine, the system comprising:
   an automated machine, the automated machine comprising:
      a secure item storage unit;
      one or more computer processors;
      a memory;
      a maintenance application stored in the memory of the automated machine, executable by the one or more computer processors of the automated machine, and configured for:
         receiving maintenance appointment information associated with a maintenance appointment from a maintenance management apparatus, the maintenance appointment information comprising a maintenance security code created by the maintenance management apparatus;
         receiving a request from a maintenance provider to initiate the maintenance appointment;
         receiving the maintenance security code from the maintenance provider;
         validating the maintenance provider in response to receiving the maintenance security code;
         in response to validating the maintenance provider, providing the maintenance provider with access to the secure item storage unit;
         determining that the maintenance provider has completed the maintenance appointment;
         in response to determining that the maintenance provider has completed the maintenance appointment, communicating maintenance completion information to the maintenance provider by (i) displaying a scannable code on a display device of the automated machine, the scannable code comprising the maintenance completion information, or (ii) transmitting the maintenance completion information to a computing device of the maintenance provider; and
   the maintenance management apparatus, the maintenance management apparatus comprising:
      one or more computer processors;
      a memory;
      a maintenance management application stored in the memory of the maintenance management apparatus, executable by the one or more computer processors of the maintenance management apparatus, and configured for:
         scheduling the maintenance appointment for the automated machine based on identifying that software of the automated machine requires updates;
         in response to scheduling the maintenance appointment, creating the maintenance security code; and
         communicating the maintenance appointment information to the automated machine.

2. The system of claim 1, wherein the maintenance management application stored in the memory of the maintenance management apparatus is configured for scheduling the maintenance appointment based on identifying that the automated machine is running low on items stored in the secure item storage unit.

3. The system of claim 1, wherein the maintenance management application stored in the memory of the maintenance management apparatus is configured for scheduling the maintenance appointment based on identifying an issue associated with hardware of the automated machine.

4. The system of claim 1, wherein:
   the maintenance appointment information comprises a scheduled time of the maintenance appointment; and
   validating the maintenance provider is based on part on comparing a current time with the scheduled time of the maintenance appointment.

5. The system of claim 1, wherein the maintenance application is configured for displaying at least a portion of the maintenance appointment information to the maintenance provider.

6. A method for providing remote maintenance initiation communication for an automated machine, the method comprising:
   scheduling, via a maintenance management apparatus, a maintenance appointment for the automated machine;
   in response to scheduling the maintenance appointment, creating, via the maintenance management apparatus, a maintenance security code;
   communicating, via the maintenance management apparatus, maintenance appointment information to the automated machine;
   receiving, via the automated machine, the maintenance appointment information associated with the maintenance appointment from the maintenance management apparatus, the maintenance appointment information comprising the maintenance security code created by the maintenance management apparatus;
   receiving, via the automated machine, a request from a maintenance provider to initiate the maintenance appointment;
   receiving, via the automated machine, the maintenance security code from the maintenance provider;
   validating, via the automated machine, the maintenance provider in response to receiving the maintenance security code;
   in response to validating the maintenance provider, providing, via the automated machine, the maintenance provider with access to a secure item storage unit of the automated machine;
   determining, via the automated machine, that the maintenance provider has completed the maintenance appointment;
   in response to determining that the maintenance provider has completed the maintenance appointment, communicating, via the automated machine, maintenance completion information to the maintenance provider by (i) displaying a scannable code on a display device of the automated machine, the scannable code comprising the maintenance completion information, or (ii) transmitting the maintenance completion information to a computing device of the maintenance provider.

7. The method of claim 6, wherein the method further comprises scheduling, via the maintenance management apparatus, the maintenance appointment based on identifying that the automated machine is running low on items stored in the secure item storage unit.

8. The method of claim 6, wherein the method further comprises scheduling, via the maintenance management apparatus, the maintenance appointment based on identifying an issue associated with hardware of the automated machine.

9. The method of claim 6, wherein:
   the maintenance appointment information comprises a scheduled time of the maintenance appointment; and
   validating the maintenance provider is based on part on comparing a current time with the scheduled time of the maintenance appointment.

10. The method of claim 6, further comprising displaying, via the automated machine, at least a portion of the maintenance appointment information to the maintenance provider.

11. A computer program product for providing remote maintenance initiation communication for an automated machine, the computer program product comprising a non-transitory computer-readable storage medium having computer-executable instructions for:
- scheduling a maintenance appointment based on identifying that software of the automated machine requires updates;
- receiving, via the automated machine, maintenance appointment information associated with the maintenance appointment from a maintenance management apparatus, the maintenance appointment information comprising a maintenance security code created by the maintenance management apparatus;
- receiving, via the automated machine, a request from a maintenance provider to initiate the maintenance appointment;
- receiving, via the automated machine, the maintenance security code from the maintenance provider;
- validating, via the automated machine, the maintenance provider in response to receiving the maintenance security code;
- in response to validating the maintenance provider, providing, via the automated machine, the maintenance provider with access to a secure item storage unit of the automated machine;
- determining, via the automated machine, that the maintenance provider has completed the maintenance appointment;
- in response to determining that the maintenance provider has completed the maintenance appointment, communicating, via the automated machine, maintenance completion information to the maintenance provider by (i) displaying a scannable code on a display device of the automated machine, the scannable code comprising the maintenance completion information, or (ii) transmitting the maintenance completion information to a computing device of the maintenance provider.

12. The computer program product of claim 11, wherein the computer program product comprising the non-transitory computer-readable storage medium having computer-executable instructions for scheduling, via the maintenance management apparatus, the maintenance appointment for the automated machine.

13. The computer program product of claim 11, wherein the computer program product comprising the non-transitory computer-readable storage medium having computer-executable instructions for scheduling the maintenance appointment based on identifying that the automated machine is running low on items stored in the secure item storage unit.

14. The computer program product of claim 11, wherein the computer program product comprising the non-transitory computer-readable storage medium having computer-executable instructions for scheduling the maintenance appointment based on identifying an issue associated with hardware of the automated machine.

15. The computer program product of claim 11, wherein the computer program product comprising the non-transitory computer-readable storage medium having computer-executable instructions for displaying at least a portion of the maintenance appointment information to the maintenance provider.

\* \* \* \* \*